US006553344B2

(12) United States Patent
Bellegarda et al.

(10) Patent No.: US 6,553,344 B2
(45) **Date of Patent: *Apr. 22, 2003**

(54) METHOD AND APPARATUS FOR IMPROVED DURATION MODELING OF PHONEMES

(75) Inventors: Jerome R. Bellegarda, Los Gatos, CA (US); Kim Silverman, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/082,438

(22) Filed: Feb. 22, 2002

(65) Prior Publication Data

US 2002/0138270 A1 Sep. 26, 2002

Related U.S. Application Data

(63) Continuation of application No. 09/436,048, filed on Nov. 8, 1999, now Pat. No. 6,366,884, which is a continuation of application No. 08/993,940, filed on Dec. 18, 1997, now Pat. No. 6,064,960.

(51) Int. Cl.[7] .................. G01L 13/06
(52) U.S. Cl. .................. 704/267; 704/269
(58) Field of Search .................. 704/258, 266, 704/267, 269, 236, 211

(56) References Cited

U.S. PATENT DOCUMENTS 3,704,345 A 11/1972 Coker et al.
3,828,132 A 8/1974 Flanagan et al.
4,278,838 A 7/1981 Antonov
4,783,807 A * 11/1988 Marley .................. 704/234
4,896,359 A 1/1990 Yamamoto et al.
5,400,434 A 3/1995 Pearson
5,477,448 A 12/1995 Golding et al.

(List continued on next page.)

OTHER PUBLICATIONS

K. Aikawa, "Speech Recognition Using Time–Warping Neural Networks", Neural Networks For Signal Processing: Proceedings of the 1991 IEEE Workshop, Sep. 30–Oct. 1, 1991, pp. 337–346.

(List continued on next page.)

*Primary Examiner*—Richemond Dorvil
*Assistant Examiner*—Martin Lerner
(74) *Attorney, Agent, or Firm*—Blakely, Sokoloff, Taylor & Zafman LLP

(57) ABSTRACT

A method and an apparatus for improved duration modeling of phonemes in a speech synthesis system are provided. According to one aspect, text is received into a processor of a speech synthesis system. The received text is processed using a sum-of-products phoneme duration model that is used in either the formant method or the concatenative method of speech generation. The phoneme duration model, which is used along with a phoneme pitch model, is produced by developing a non-exponential functional transformation form for use with a generalized additive model. The non-exponential functional transformation form comprises a root sinusoidal transformation that is controlled in response to a minimum phoneme duration and a maximum phoneme duration. The minimum and maximum phoneme durations are observed in training data. The received text is processed by specifying at least one of a number of contextual factors for the generalized additive model. An inverse of the non-exponential functional transformation is applied to duration observations, or training data. Coefficients are generated for use with the generalized additive model. The generalized additive model comprising the coefficients is applied to at least one phoneme of the received text resulting in the generation of at least one phoneme having a duration. An acoustic sequence is generated comprising speech signals that are representative of the received text.

24 Claims, 11 Drawing Sheets

U.S. PATENT DOCUMENTS

| | | | | | |
|---|---|---|---|---|---|
| 5,485,372 | A | | 1/1996 | Golding et al. | |
| 5,521,816 | A | | 5/1996 | Roche et al. | |
| 5,535,121 | A | | 7/1996 | Roche et al. | |
| 5,536,902 | A | | 7/1996 | Serra et al. | |
| 5,537,317 | A | | 7/1996 | Schabes et al. | |
| 5,617,507 | A | | 4/1997 | Lee et al. | |
| 5,621,859 | A | | 4/1997 | Schwartz et al. | |
| 5,712,957 | A | | 1/1998 | Waibel et al. | |
| 5,729,694 | A | | 3/1998 | Holzrichter et al. | |
| 5,790,978 | A | * | 8/1998 | Olive et al. | 704/205 |
| 5,799,269 | A | | 8/1998 | Schabes et al. | |
| 5,799,276 | A | | 8/1998 | Komissarchik et al. | |
| 6,038,533 | A | | 3/2000 | Buchsbaum et al. | |
| 6,064,960 | A | | 5/2000 | Bellegarda et al. | |
| 6,330,538 | B1 | * | 12/2001 | Breen | 704/260 |
| 6,366,884 | B1 | * | 4/2002 | Bellegarda et al. | 704/266 |

OTHER PUBLICATIONS

Anastasakos et al., "Duration Modeling In Large Vocabulary Speech Recognition", 1995 International Conference On Acoustics, Speech, and Signal Processing, May 9–15, 1995, vol. 1, pp. 628–631.

Silverman et al. "Using A Sigmoid Transformation For Improved Modeling Of Phoneme Duration", 1999 IEEE International Conference on Acoustics, Speech, and Signal Processing, vol. 1, Mar. 1999, pp. 385–388.

Klatt, D. "Linguistic Uses Of Segmental Duration In English: Acoustic and Perceptual Evidence", The Journal of the Acoustical Society of America, vol.59, No.5, May 1976, pp. 1208–1221.

Van Santen J., "Assignment of Segmental Duration in Text–to–Speech Synthesis", Computer Speech and Language, vol.8, No.2, Apr. 1994, pp. 95–128.

Fredic J. Harris, "On The Use Of Windows For Harmoic Analysis With The Discrete Fourier Transform", Proceedings of the IEEE, vol.66, No.1; Jan. 1978; pp. 51–84.

* cited by examiner

METHOD AND APPARATUS FOR IMPROVED DURATION MODELING OF PHONEMES

Related Applications

This application is a continuation of an U.S. patent application Ser. No. 09/436,048, filed Nov. 8, 1999 now U.S. Pat. No. 6,366,884, which is a continuation of U.S. patent application Ser. No. 08/993,940, filed Dec. 18, 1997, now issued as U.S. Pat. No. 6,064,960.

FIELD OF THE INVENTION

This invention relates to speech synthesis systems. More particularly, this invention relates to the modeling of phoneme duration in speech synthesis.

BACKGROUND OF THE INVENTION

Speech is used to communicate information from a speaker to a listener. Human speech production involves thought conveyance through a series of neurological processes and muscular movements to produce an acoustic sound pressure wave. To achieve speech, a speaker converts an idea into a linguistic structure by choosing appropriate words or phrases to represent the idea, orders the words or phrases based on grammatical rules of a language, and adds any additional local or global characteristics such as pitch intonation, duration, and stress to emphasize aspects important for overall meaning. Therefore, once a speaker has formed a thought to be communicated to a listener, they construct a phrase or sentence by choosing from a collection of finite mutually exclusive sounds, or phonemes. Following phrase or sentence construction, the human brain produces a sequence of motor commands that move the various muscles of the vocal system to produce the desired sound pressure wave.

Speech can be characterized in terms of acoustic-phonetics and articulatory phonetics. Acoustic-phonetics are described as the frequency structure, time waveform characteristics of speech. Acoustic-phonetics show the spectral characteristics of the speech wave to be time-varying, or nonstationary, since the physical system changes rapidly over time. Consequently, speech can be divided into sound segments that possess similar acoustic properties over short periods of time. A time waveform of a speech. signal is used to determine signal periodicities, intensities, durations, and boundaries of individual speech sounds. This time waveform indicates that speech is not a string of discrete well-formed sounds, but rather a series of steady-state or target sounds with intermediate transitions. The preceding and succeeding sound in a string can grossly affect whether a target is reached completely, how long it is held, and other finer details of the sound. As the string of sounds forming a particular utterance are continuous, there exists an interplay between the sounds of the utterance called coarticulation. Coarticulation is the term used to refer to the change in phoneme articulation and acoustics caused by the influence of another sound in the same utterance.

Articulatory phonetics are described as the manner or place of articulation or the manner or place of adjustment and movement of speech organs involved in pronouncing an utterance. Changes found in the speech waveform are a direct consequence of movements of the speech system articulators, which rarely remain fixed for any sustained period of time. The speech system articulators are defined as the finer human anatomical components that move to different positions to produce various speech sounds. The speech system articulators comprise the vocal folds or vocal cords, the soft palate or velum, the tongue, the teeth, the lips, the uvula, and the mandible or jaw. These articulators determine the properties of the speech system because they are responsible for regions of emphasis, or resonances, and deemphasis, or antiresonances, for each sound in a speech signal spectrum. These resonances are a consequence of the articulators having formed various acoustical cavities and subcavities out of the vocal tract cavities. Therefore, each vocal tract shape is characterized by a set of resonant frequencies. Since these resonances tend to "form" the overall spectrum they are referred to as formants.

One prior art approach to speech synthesis is the formant synthesis approach. The formant synthesis approach is based on a mathematical model of the human vocal tract in which a time domain-speech signal is Fourier transformed. The transformed signal is evaluated for each formant, and the speech synthesis system is programmed to recreate the formants associated with particular sounds. The problem with the formant synthesis approach is that the transition between individual sounds is difficult to recreate. This results in synthetic speech that sounds contrived and unnatural.

While speech production involves a complex sequence of articulatory movements timed so that vocal tract shapes occur in a desired phoneme sequence order, expressive uses of speech depend on tonal patterns of pitch, syllable stresses, and timing to form rhythmic speech patterns. Timing and rhythms of speech provide a significant contribution to the formal linguistic structure of speech communication. The tonal and rhythmic aspects of speech are referred to as the prosodic features. The acoustic patterns of prosodic features are heard in changes in duration, intensity, fundamental frequency, and spectral patterns of the individual phonemes.

A phoneme is the basic theoretical unit for describing how speech conveys linguistic meaning. As such, the phonemes of a language comprise a minimal theoretical set of units that are sufficient to convey all mearing in the language; this is to be compared with the actual sounds that are produced in speaking, which speech scientists call allophones. For American English, there are approximately 50 phonemes which are made up of vowels, semivowels, diphthongs, and consonants. Each phoneme can be considered to be a code that consists of a unique set of articulatory gestures. If speakers could exactly and consistently produce these phoneme sounds, speech would amount to a stream of discrete codes. However, because of many different factors including, for example, accents, gender, and coarticulatory effects, every phoneme has a variety of acoustic manifestations in the course of flowing speech. Thus, from an acoustical point of view, the phoneme actually represents a class of sounds that convey the same meaning.

The most abstract problem involved in speech synthesis is enabling the speech synthesis system with the appropriate language constraints. Whether phones, phonemes, syllables, or words are viewed as the basic unit of speech, language, or linguistic, constraints are generally concerned with how these fundamental units may be concatenated, in what order, in what context, and with what intended meaning. For example, if a speaker is asked to voice a phoneme in isolation, the phoneme will be clearly identifiable in the acoustic waveform. However, when spoken in context, phoneme boundaries become difficult to label because of the physical properties of the speech articulators. Since the vocal tract articulators consist of human tissue, their positioning from one phoneme to the next is executed by movement of muscles that control articulator movement. As such, the duration of a phoneme and the transition between phonemes can modify the manner in which a phoneme is produced. Therefore, associated with each phoneme is a collection of allophones, or variations on phones, that represent acoustic variations of the basic phoneme unit. Allophones represent the permissible freedom allowed within a particular language in producing a phoneme, and this flexibility is dependent on the phoneme as well as on the phoneme position within an utterance.

Another prior art approach to speech synthesis is the concatenation approach. The concatenation approach is more flexible than the formant synthesis approach because, in combining diphone sounds from different stored words to form new words, the concatenation approach better handles the transition between phoneme sounds. The concatenation approach is also advantageous because it eliminates the decision on which formant or which portion of the frequency band of a particular sound is to be used in the synthesis of the sound. The disadvantage of the concatenation approach is that discontinuities occur when the diphones from different words are combined to form new words. These discontinuities are the result of slight differences in frequency, magnitude, and phase between different diphones.

In using the concatenation approach for speech synthesis, four elements are frequently used to produce an acoustic sequence. These four elements comprise a library of diphones, a processing approach for combining the diphones of the library, information regarding the acoustic patterns of the prosodic feature of duration for the diphones, and information regarding the acoustic patterns of the prosodic feature of pitch for the diphones.

As previously discussed, in natural human speech the durations of phonetic segments are strongly dependent on contextual factors including, but not limited to, the identities of surrounding segments, within-word position, and presence of phase boundaries. For synthetic speech to sound natural, these duration patterns must be closely reproduced by automatic text-to-speech systems. Two prior art approaches have been followed for duration prediction: general classification techniques, such as decision trees and neutral networks; and sum-of-products methods based on multiple linear regression either in the linear or the log domain.

These two approaches to speech synthesis differ in the amount of linguistic knowledge required. These approaches also differ in the behavior of the model in situations not encountered during training. General classification techniques are almost always completely data-driven and, therefore, require a large amount of training data. Furthermore, they cope with never-encountered circumstances by using coarser representations thereby sacrificing resolution. In contrast, sum-of-products models embody a great deal of linguistic knowledge, which makes them more robust to the absence of data. In addition, the sum-of-products models predict durations for never-encountered contexts through interpolation, making use of the ordered structure uncovered during analysis of the data. Given the typical size of training corpora currently available, the sum-of-products approach tends to outperform the general classification approach, particularly when cross-corpus evaluation is considered. Thus, sum-of-products models are typically preferred.

When sum-of-products models are applied in the linear domain, they lead to various derivatives of the original additive model. When they are applied in the log domain, they lead to multiplicative models. The evidence appears to indicate that multiplicative duration models perform better than additive duration models because the distributions tend to be less skewed after the log transform. The multiplicative duration models also perform better because the fractional approach underlying multiplicative models is better suited for the small durations encountered with phonemes.

The origin of the sum-of-products approach, as applied to duration data, can be traced to the axiomatic measurement theorem. This theorem states that under certain conditions the duration function D can be described by the generalized additive model given by $$D(f_1, f_2, \ldots f_N) = F\left[\sum_{i=1}^{N} \prod_{j=1}^{M_i} a_{i,j} f_i(j)\right], \tag{1}$$

where $f_i$(i=1, . . . , N) represents the ith contextual factor influencing D, $M_i$ is the number of values that $f_i$ can take, $a_{i,j}$ is the factor scale corresponding to the jth value of factor $f_i$ denoted by $f_i(j)$, and F is an unknown monotonically increasing transformation. Thus, F(x)=x corresponds to the additive case and F (x)=exp (x) corresponds to the multiplicative case.

The conditions under which the duration function can be described by equation 1 have to do with factor independence. Specifically, a function F can be constructed having a set of factor scales $a_{i,j}$ such that equation 1 holds only if joint independence holds for all subsets of 2, 3, . . . , N factors. Typically, this is not going to be the case for duration data because, for example, it is well known that the interaction between accent and phrasal position significantly influences vowel duration. Thus, accent and phrasal position are not independent factors.

In contrast, such dependent interactions tend to be well-behaved in that their effects are amplificatory rather than reversed or otherwise permuted. This has formed the basis of a regularity argument in favor of the application of equation 1 in spite of the dependent interactions. Although the assumption of joint independence is violated, the regular patterns of amplificatory interactions, make it plausible that some sum-of-products model will fit appropriately transformed durations.

Therefore, the problem is that violating the joint independence assumption may substantially complicate the search for the transformation F. So far only strictly increasing functionals have been considered, such as F(x)=x and F(x)=exp(x). But the optimal transformation F may no longer be strictly increasing, opening up the possibility of inflection points, or even discontinuities. If this were the case, then the exponential transformation implied in the multiplicative model would not be the best choice. Consequently, there is a need for a functional transformation that, in the presence of amplificatory interactions, improves the duration modeling of phonemes in a synthetic speech generator.

SUMMARY OF THE INVETION

A method and an apparatus for improved duration modeling of phonemes in a speech synthesis system are provided. According to one aspect of the invention, text is received into a processor of a speech synthesis system. The received text is processed using a sum-of-products phoneme duration model hosted on the speech synthesis system. The phoneme duration model, which is used along with a phoneme pitch model, is produced by developing a non-exponential functional transformation form for use with a generalized additive model. The non-exponential functional transformation form comprises a root sinusoidal transformation that is controlled in response to a minimum phoneme duration and a maximum phoneme duration. The minimum and maximum phoneme durations are observed in training data.

The received text is processed by specifying at least one of a number of contextual factors for the generalized additive model. The number of contextual factors may comprise an interaction between accent and the identity of a following phoneme, an interaction between accent and the identity of a preceding phoneme, an interaction between accent and a number of phonemes to the end of an utterance, a number of syllables to a nuclear accent of an utterance, a number of syllables to an end of an utterance, an interaction between syllable position and a position of a phoneme with respect to a left edge of the phoneme enclosing word, an onset of an enclosing syllable, and a coda of an enclosing syllable. An inverse of the non-exponential functional transformation is applied to duration observations, or training data. Coefficients are generated for use with the generalized additive model. The generalized additive model comprising the coefficients is applied to at least one phoneme of the received text resulting in the generation of at least one phoneme having a duration. An acoustic sequence is generated comprising speech signals that are representative of the received text. The phoneme duration model may be used with the formant method of speech generation and the concatenative method of speech generation.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTON

A method and an apparatus for improved duration modeling of phonemes in a speech synthesis system are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block. diagram form in order to avoid unnecessarily obscuring the present invention. It is noted that experiments with the method and apparatus provided herein show significant improvements in synthesized speech when compared to typical prior art speech synthesis systems.

Figure 1:
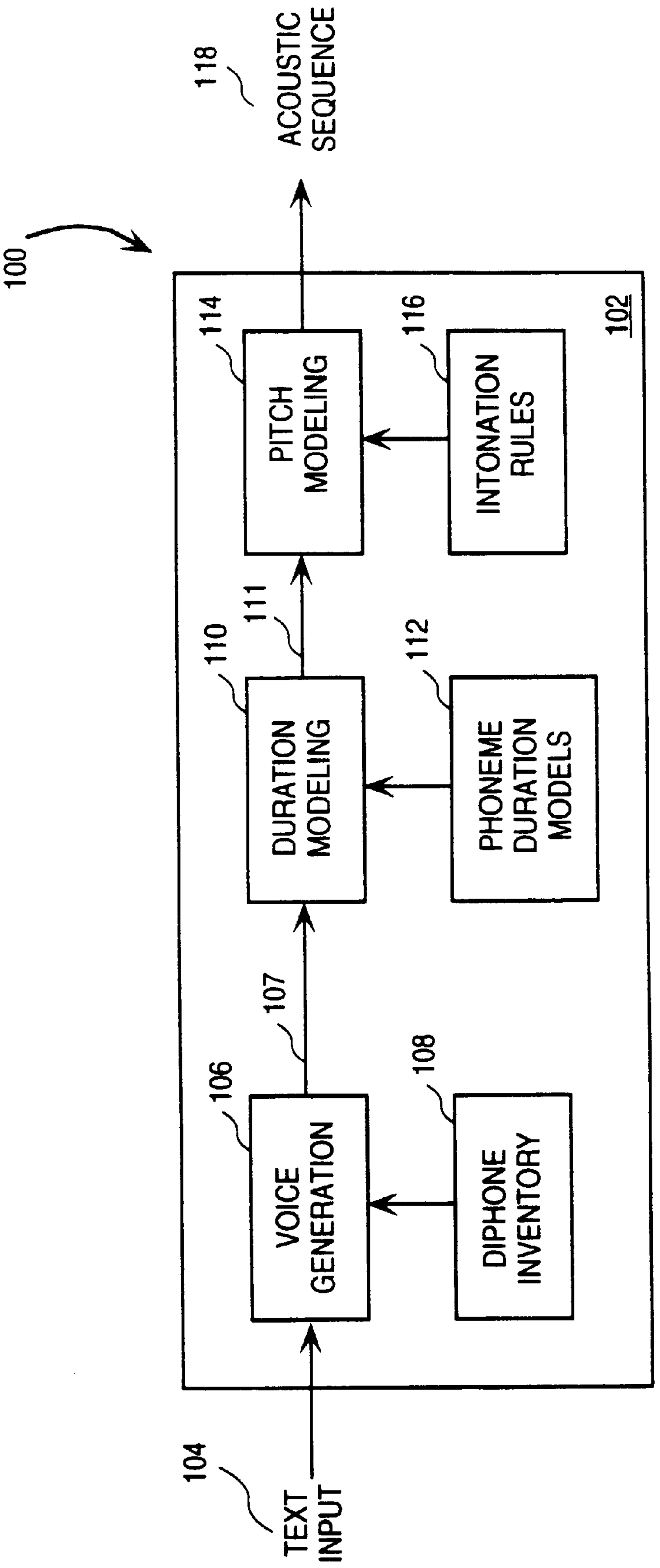
FIG. 1 is a speech synthesis system of one embodiment.

FIG. 1 is a speech synthesis system 100 of one embodiment. A system input is coupled to receive text 104 into the system processor 102. A voice generation device 106 receives the text input 104 and processes it in accordance with a prespecified speech generation protocol. The speech synthesis system 100 processes the text input 104 in accordance with a diphone inventory, or concatenative, speech generation model 108. Therefore, the voice generation device 106 selects the diphones corresponding to the received text 104, in accordance with the concatenative model 108, and performs the processing necessary to synthesize an acoustic phoneme sequence from the selected phonemes.

Figure 2:
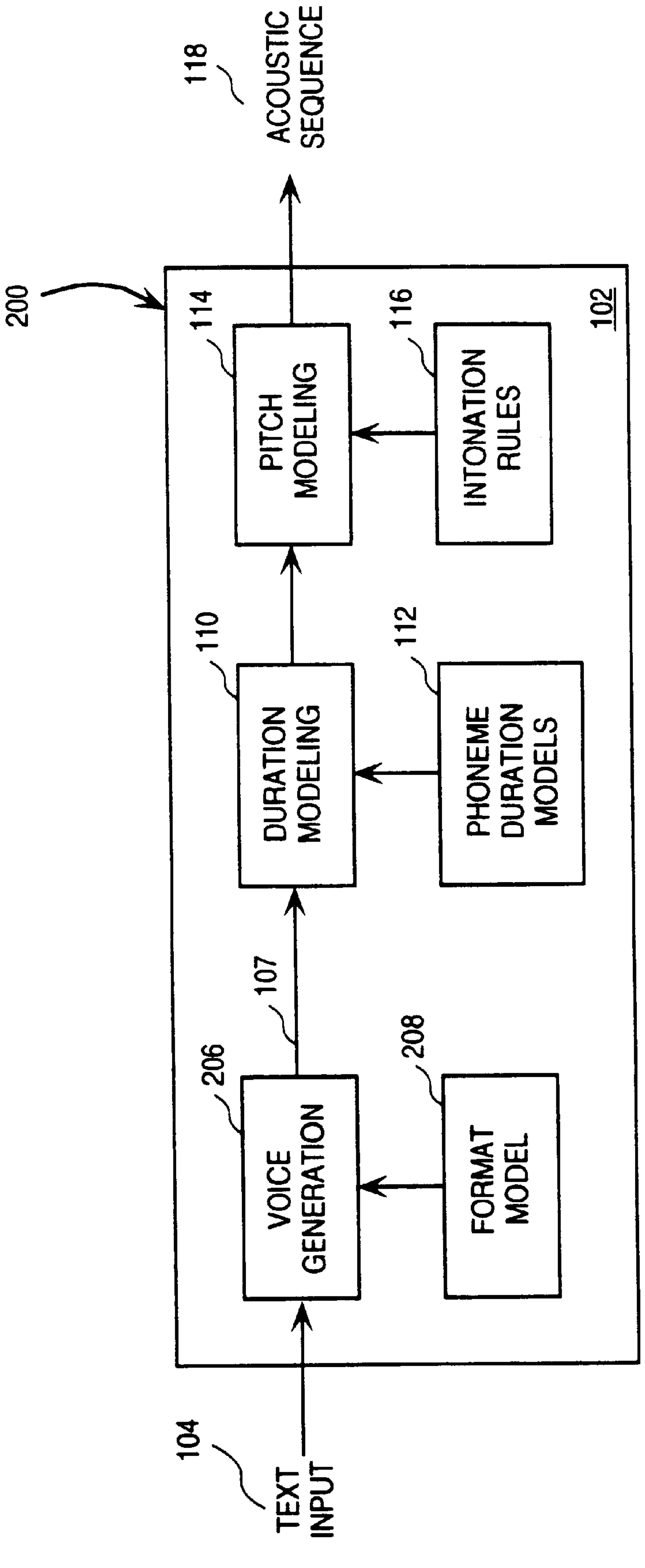
FIG. 2 is a speech synthesis system of an alternate embodiment.

FIG. 2 is a speech synthesis system 200 of an alternate embodiment. This speech synthesis system 200 processes the text input 104 in accordance with a formant synthesis speech generation model 208. Therefore, the voice generation device 206 selects the formants corresponding to the received text 104 and performs the processing necessary to synthesize an acoustic phoneme sequence from the selected formants. The speech synthesis system 200 using the formant synthesis model 208 is typically the same as the speech synthesis system 100 using the concatenative model 108 in all other respects.

Coupled to the voice generation device 106 and 206 of one embodiment is a duration modeling device 110 that hosts or receives inputs from a phoneme duration model 112. The phoneme duration model 112 in one embodiment is produced by developing a non-exponential functional transformation form for use with a generalized additive model as discussed herein. The non-exponential functional transformation form comprises a root sinusoidal transformation that is controlled in response to a minimum phoneme duration and a maximum phoneme duration of observed training phoneme data. The duration modeling device 110 receives the initial phonemes 107 from the voice generation device 106 and 206 and provides durations for the initial phonemes as discussed herein.

A pitch modeling device 114 is coupled to receive the initial phonemes having durations 111 from the duration modeling device 110. The pitch modeling device 114 uses intonation rules 116 to provide pitch information for the phonemes. The output of the pitch modeling device 114 is an acoustic sequence of synthesized speech signals 118 representative of the received text 104.

The speech synthesis systems 100 and 200 may be hosted on a processor, but are not so limited. For an alternate embodiment, the systems 100 and 200 may comprise some combination of hardware and software that is hosted on a number of different processors. For another alternate embodiment, a number of model devices may be hosted on a number of different processors. Another alternate embodiment has a number of different model devices hosted on a single processor.

Figure 3:
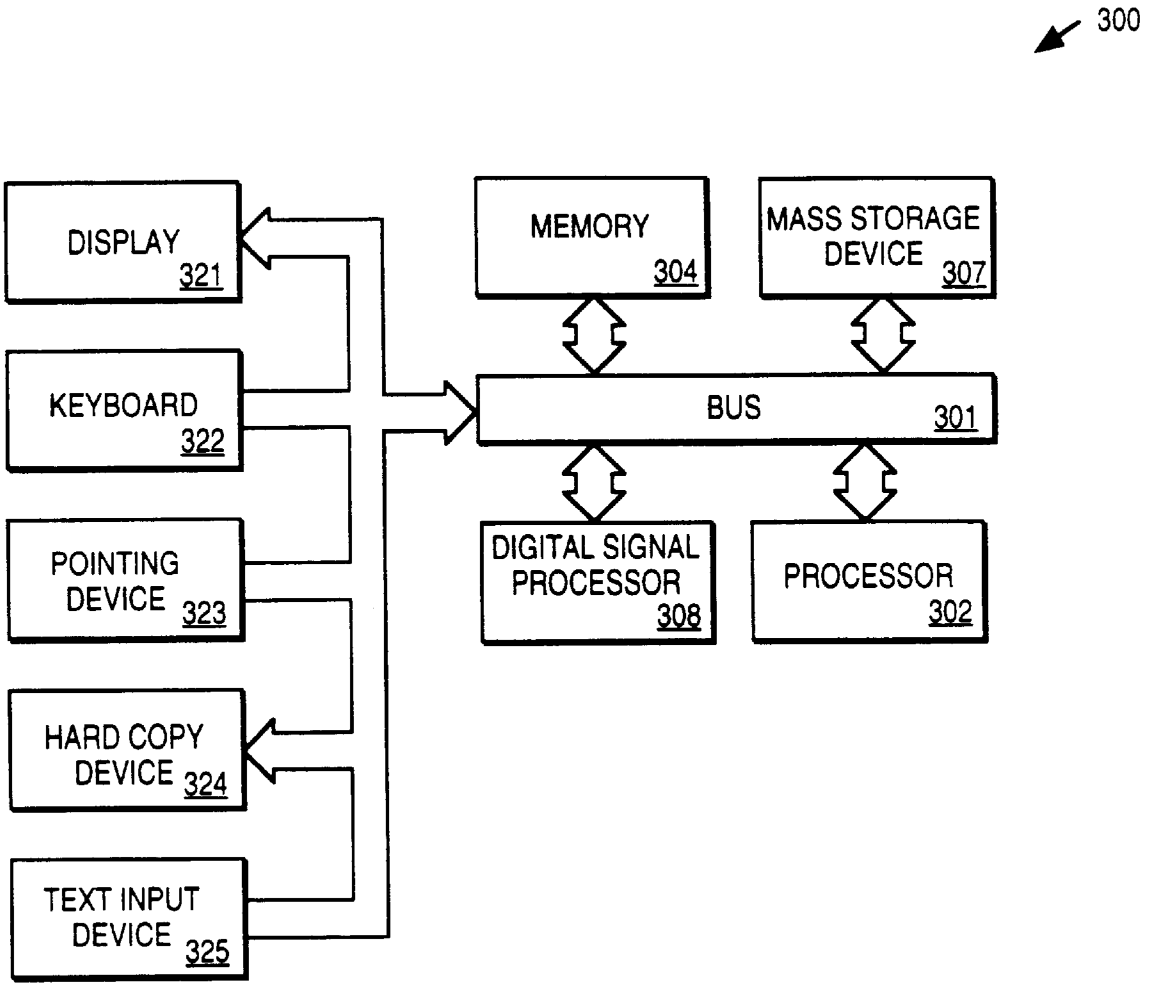
FIG. 3 is a computer system hosting the speech synthesis system of one embodiment.

FIG. 3 is a computer system 300 hosting the speech synthesis system of one embodiment. The computer system 300 comprises, but is not limited to, a system bus 301 that allows for communication among a processor 302, a digital signal processor 308, a memory 304, and a mass storage device 307. The system bus 301 is also coupled to receive inputs from a keyboard 322, a pointing device 323, and a text input device 325, but is not so limited. The system bus 301 provides outputs to a display device 321 and a hard copy device 324, but is not so limited.

Figure 4:
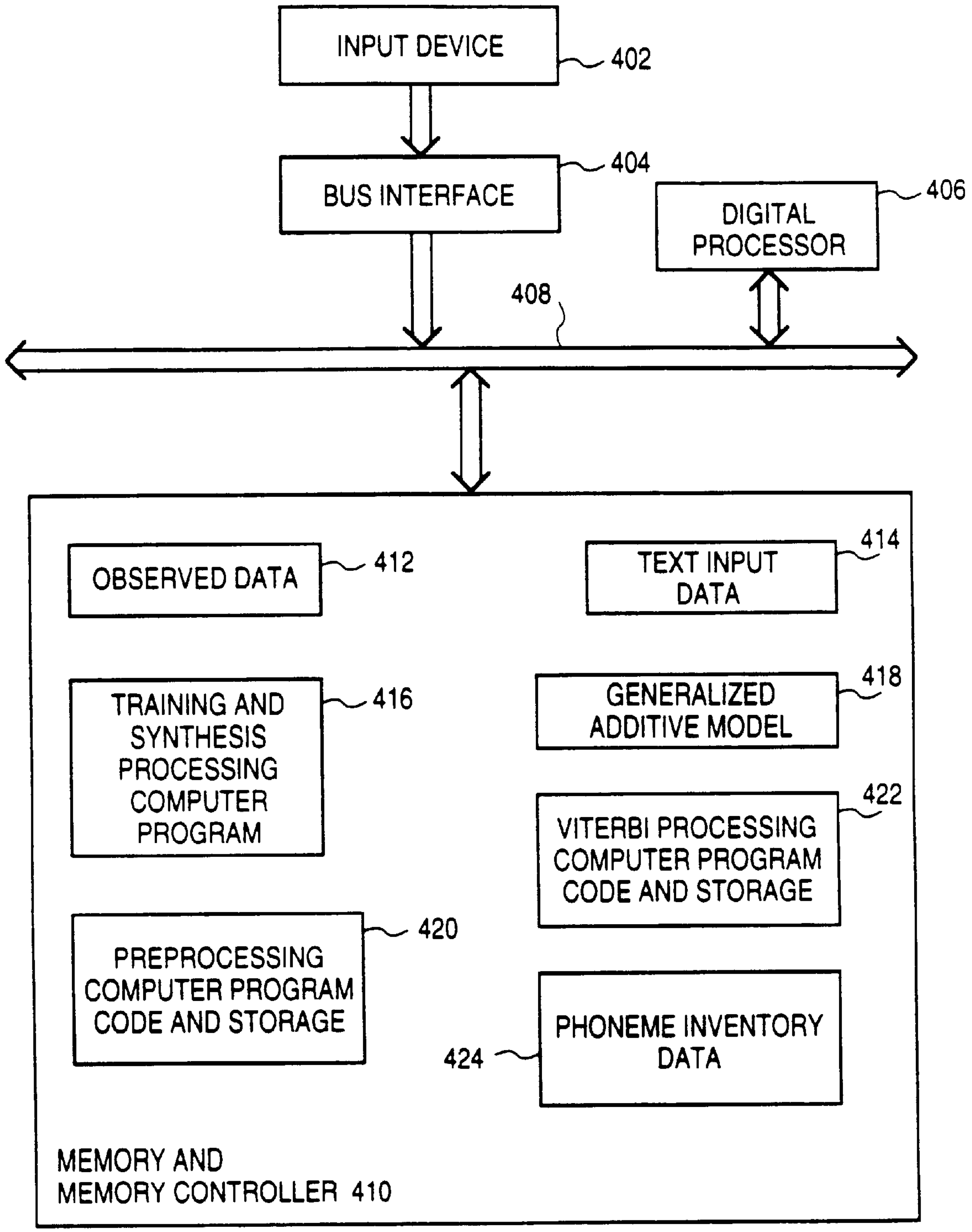
FIG. 4 is the computer system memory hosting the speech generation system of one embodiment.

FIG. 4 is the computer system memory 410 hosting the speech generation system of one embodiment. An input device 402 provides text input to a bus interface 404. The bus interface 404 allows for storage of the input text in the text input data memory component 414 of the memory 410 via the system bus 408. The text is processed by a digital processor 406 using algorithms and data stored in the components 412–424 of the memory 410. As discussed herein, the algorithms and data that are used in processing the text to generate synthetic speech are stored in components of the memory 410 comprising, but not limited to, observed data 412, text input data 414, training and synthesis processing computer program 416, generalized additive model 418, preprocessing computer program code and storage 420, viterbi processing computer program code and storage 422, and phoneme inventory data 424.

Figure 5:
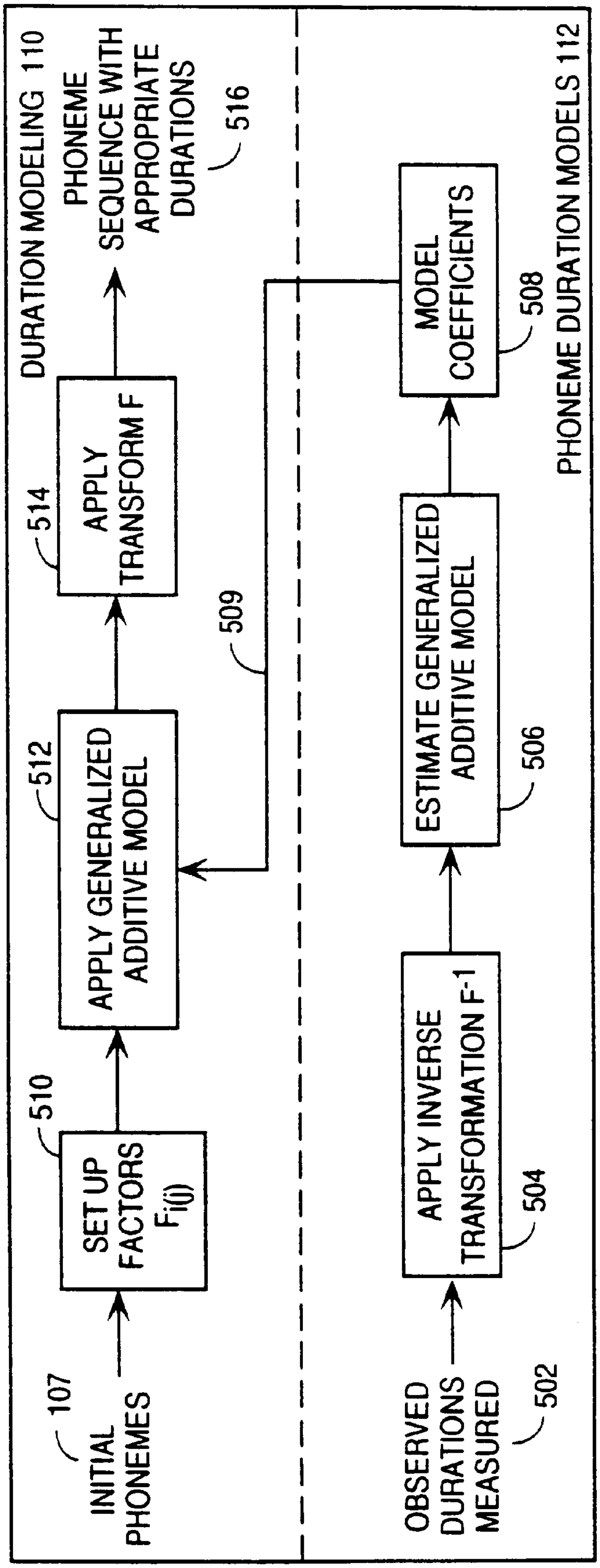
FIG. 5 is a duration modeling device and a phoneme duration model of a speech synthesis system of one embodiment.

FIG. 5 is a duration modeling device 110 and a phoneme duration model 112 of a speech synthesis system of one embodiment. Following the development of a non-exponential functional transformation as discussed herein, the inverse of the transformation 504 is applied to the measured durations of the observed training phonemes 502. A generalized additive model 506 is estimated from the application of the inverse transformation 504 to the measured durations of the observed training phonemes. The estimation of the generalized additive model 506 produces model coefficients 508 for use in the generalized additive model 512 that is to be applied to the initial phonemes 107 received from the voice generation device 106 and 206. The model coefficients 508 are the output 509 of the phoneme duration model 112.

The duration modeling device 110 receives the initial phonemes 107 from the voice generation device 106 and 206. The factors $f_i(j)$ of the functional transformation are established 510 for the initial phonemes. The generalized additive model 512 is applied, the generalized additive model 512 using the model coefficients 508 generated by the phoneme duration model 112. Following application of the generalized additive model 512, the functional transformation is applied 514 resulting in a phoneme sequence having the appropriately modeled durations 516. The phoneme sequence 516 is coupled to be received by the pitch modeling device 114. The development of the phoneme duration model and the non-exponential functional transformation are now discussed.

Figure 6:
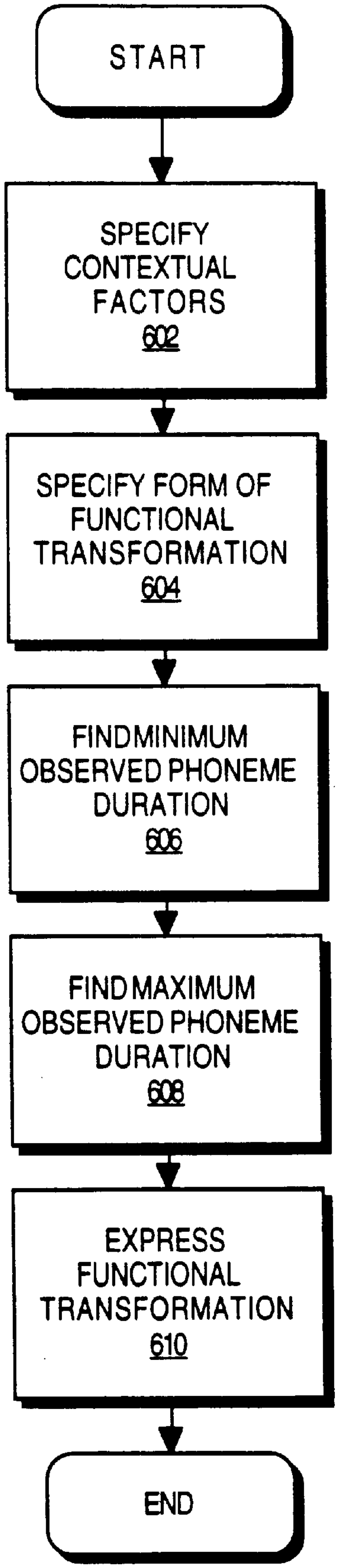
FIG. 6 is a flowchart for developing the non-exponential functional transformation of one embodiment.

FIG. 6 is a flowchart for developing the non-exponential functional transformation of one embodiment. In developing the phoneme duration model, the factors to be used in the generalized additive model of equation 1 must first be specified, at step 602. To simplify the formulation, a common set of factors are used across all phonemes, where some of the factors correspond to interaction terms between elementary contextual characteristics. This common set of factors comprises, but is not limited to: the interaction between accent and the identity of the following phoneme; the interaction between accent and the identity of the preceding phoneme; the interaction between accent and the number of phonemes to the end of the utterance; the number of syllables to the nuclear accent of the utterance; the number of syllables to the end of the utterance; the interaction between syllable position and the position of the phoneme with respect to the left edge of its enclosing word; the onset of the enclosing syllable; and the coda of the enclosing syllable.

At this point in the phoneme duration model development, two implementations are possible depending on the size of the training corpus. If the training corpus is large enough to accommodate detailed modeling, one model can be derived per phoneme. If the training corpus is not large enough to accommodate detailed modeling, phonemes can be clustered and one phoneme duration model is derived per phoneme cluster. The remainder of this discussion assumes, without loss of generality, that there is one distinct model per phoneme.

Once the above set of factors for use in the generalized additive model are determined at step 602, the form of the functional, F, must be specified, at step 604, to complete the model of equation 1. When amplificatory interactions are considered in developing an optimal functional transformation, as previously discussed, it can be postulated that such interactions, because of their amplificatory nature, will transpire in the case of large phoneme durations to a greater extent than in the case of small phoneme durations. Thus, to compensate for the joint independence violation, large phoneme durations should shrink while small phoneme durations should expand. In the first approximation, this compensation leads to at least one inflection point in the transformation F. This inflection point rules out the prior art exponential functional transformation. Consequently, a non-exponential functional transformation is used, the non-exponential functional transformation comprising a root sinusoidal functional transformation. At step 606, a minimum phoneme duration is observed in the training data for each phoneme under study. A maximum phoneme duration is observed in the training data for each phoneme under study, at step 608.

The non-exponential functional transformation of one embodiment is, at step 610, expressed by $$F(x) = \left\{\frac{B-A}{2}\left[\cos\left(\pi\frac{x-A}{B-A}\right]^{\alpha} + \frac{A+B}{2}\right\}^{\beta}, , \tag{2}$$

where A denotes the minimum duration observed in the training data for the particular phoneme under study, B denotes the maximum duration observed in the training data for the particular phoneme under study, and where the parameters α and β help to control the shape of the transformation. Specifically, α controls the amount of shrinking/expansion which happens on either side of the main inflection point, while β controls the position of the main inflection point within the range of durations observed.

Figure 7:
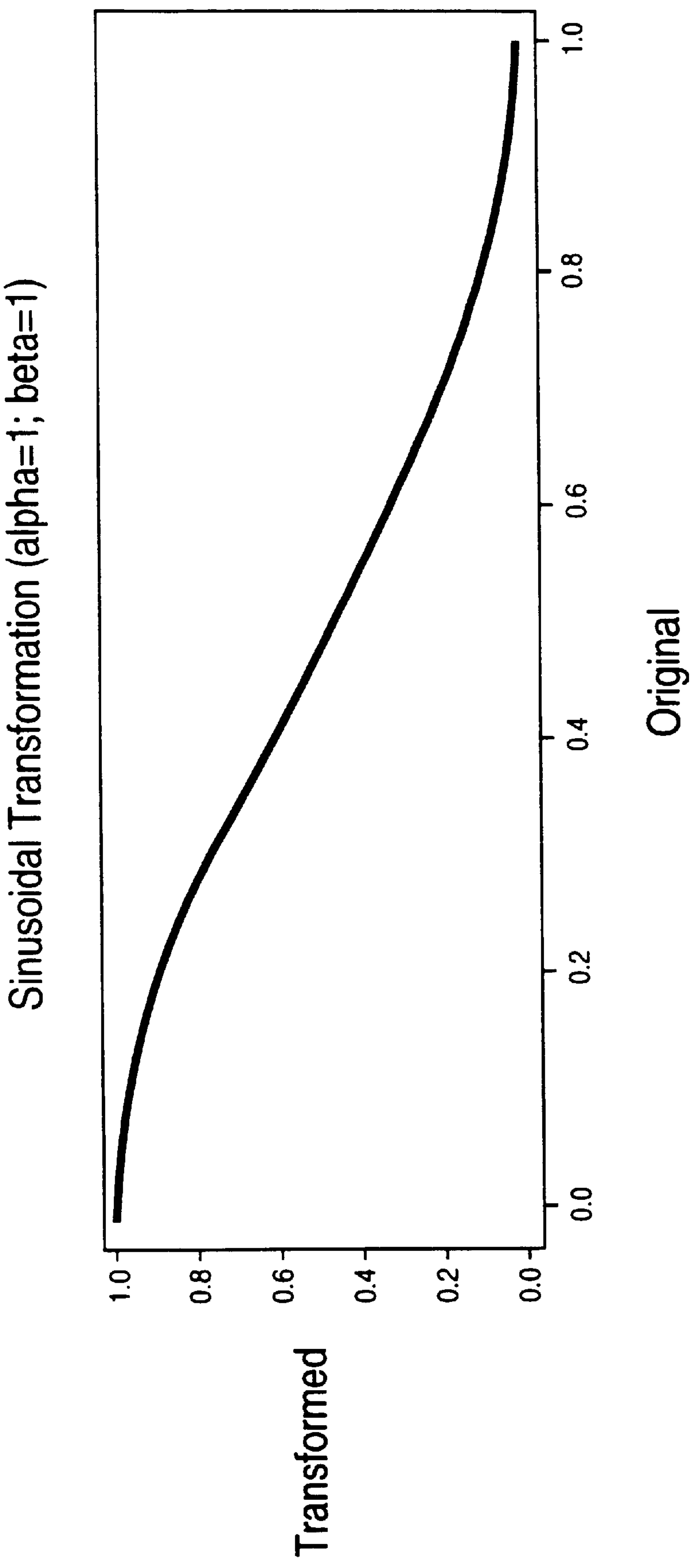
FIG. 7 is a graph of the functional transformation of equation 2 in one embodiment where $\alpha=1$, $\beta=1$.
Figure 8:
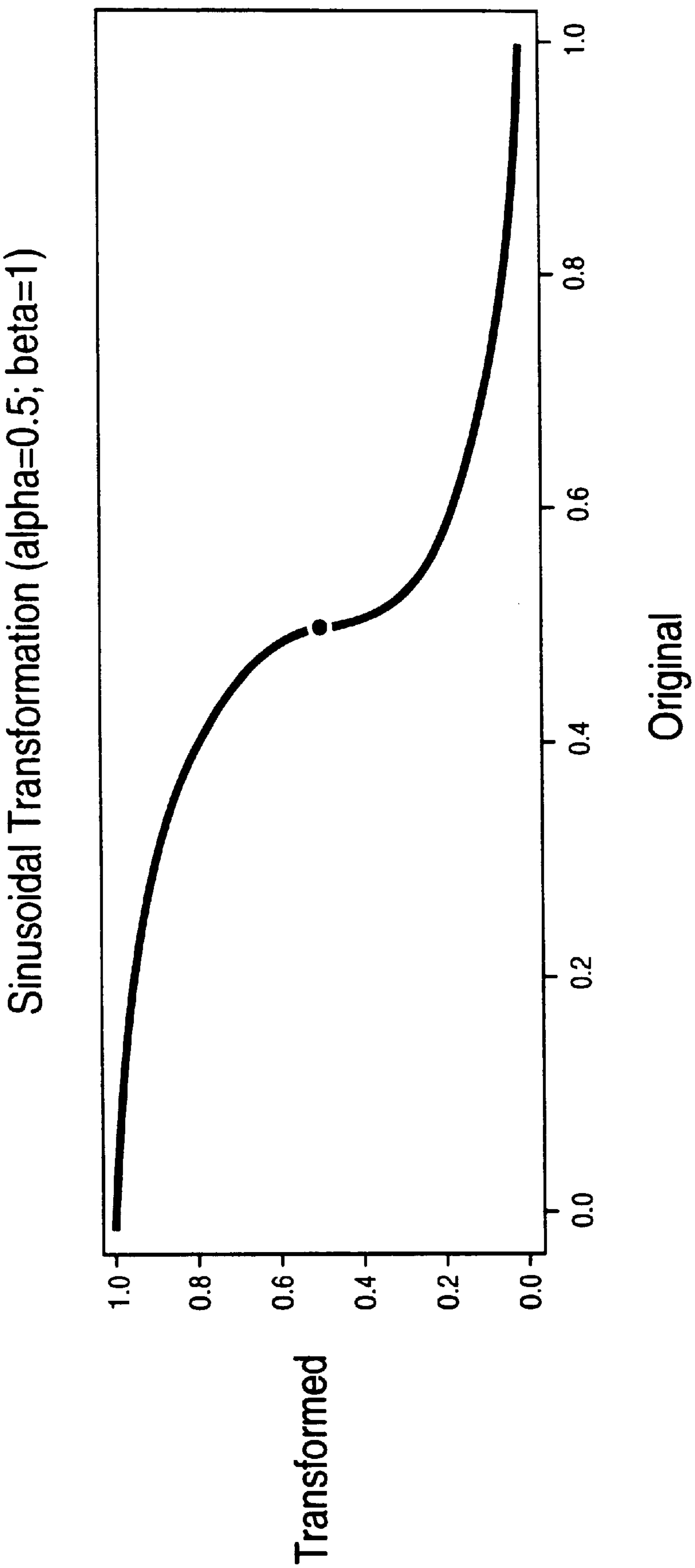
FIG. 8 is a graph of the functional transformation of equation 2 in one embodiment where $\alpha=0.5$, $\beta=1$.
Figure 9:
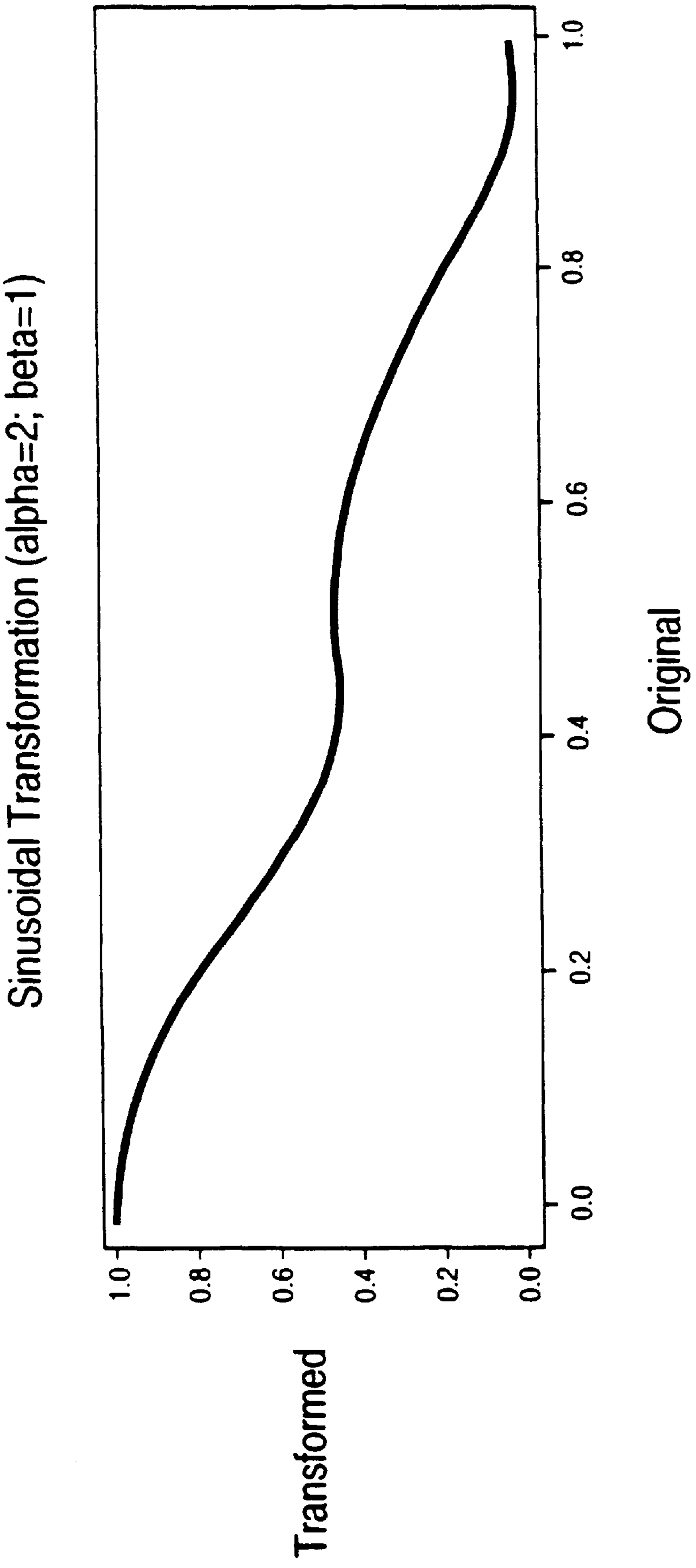
FIG. 9 is a graph of the functional transformation of equation 2 in one embodiment where $\alpha=2$, $\beta=1$.
Figure 10:
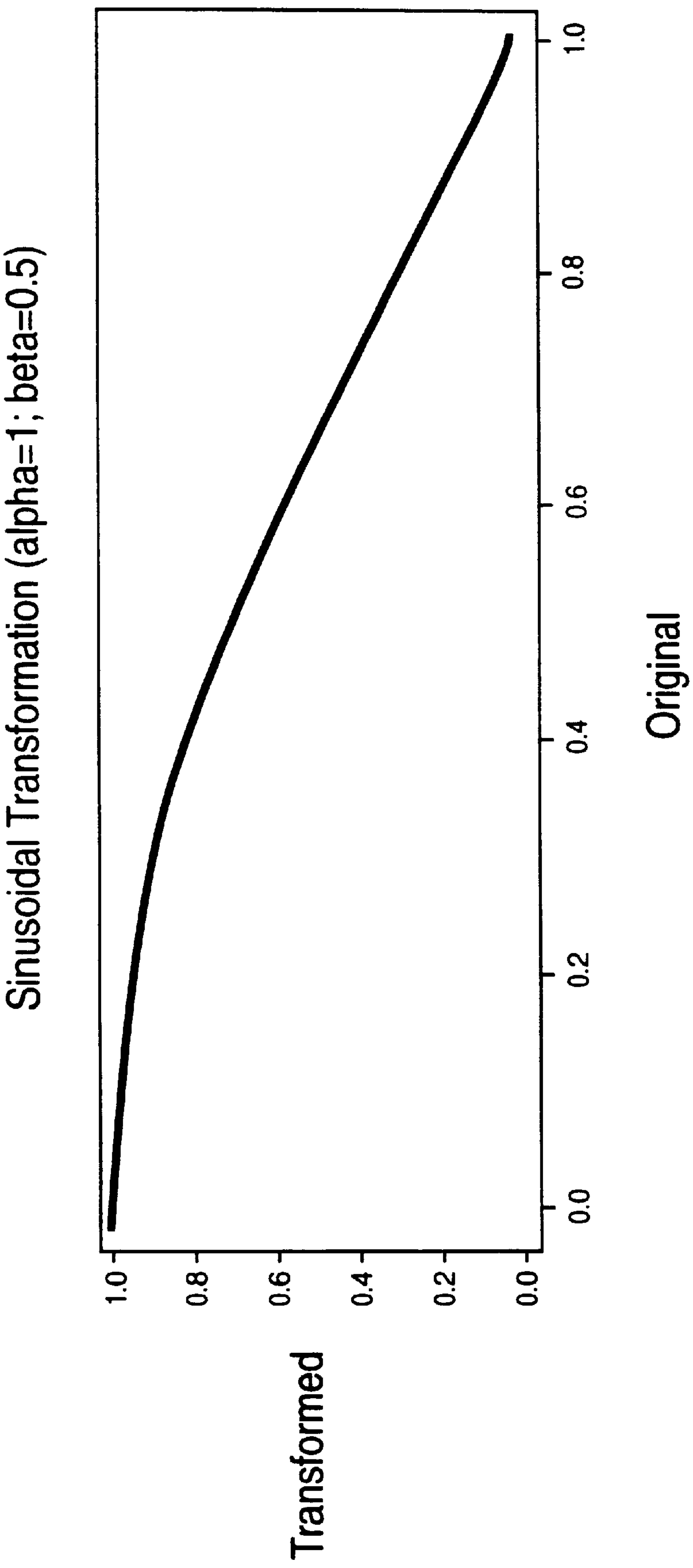
FIG. 10 is a graph of the functional transformation of equation 2 in one embodiment where $\alpha=1$, $\beta=0.5$.
Figure 11:
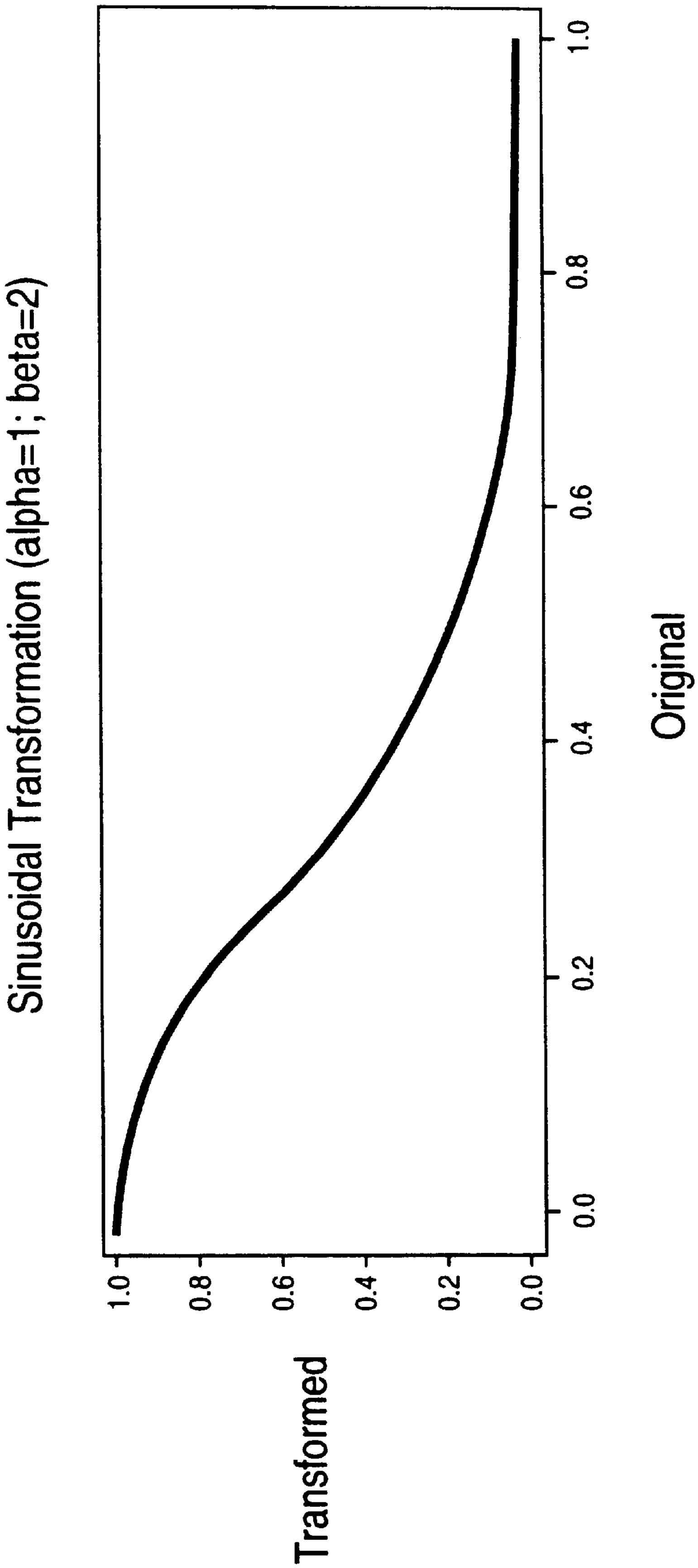
FIG. 11 is a graph of the functional transformation of equation 2 in one embodiment where $\alpha=1$, $\beta=2$.

FIG. 7 is a graph of the functional transformation of equation 2 in one embodiment where α=1, β=1. FIG. 8 is a graph of the functional transformation of equation 2 in one embodiment where α=0.5, β=1. FIG. 9 is a graph of the functional transformation of equation 2 in one embodiment where α=2, β=1. FIG. 10 is a graph of the functional transformation of equation 2 in one embodiment where α=1, β=0.5. FIG. 11 is a graph of the functional transformation of equation 2 in one embodiment where α=1, β=2. It can be seen from FIGS. 7–11 that values α<1 lead to shrinking/expansion over a greater range of durations, while values α>1 lead to the opposite behavior. Furthermore, it can be seen that values $\beta<1$ push the main inflection point to the right toward large durations, while values $\beta>1$ push it to the left toward small durations.

It should be noted that the optimal values of the parameters $\alpha$ and $\beta$ are dependent on the phoneme identity, since the shape of the functional is tied to the duration distributions observed in the training data. However, it has been found that $\alpha$ is less sensitive than $\beta$ in that regard. Specifically, while for $\beta$ the optimal range is between approximately 0.3 and 2, the value $\alpha=0.7$ seems to be adequate across all phonemes.

Evaluations of the phoneme duration model of one embodiment were conducted using a collection of Prosodic Contexts. This corpus was carefully designed to comprise a large variety of phonetic contexts in various combinations of accent patterns. The phonemic alphabet had size 40, and the portion of the corpus considered comprised 31,219 observations. Thus, on the average, there were about 780 observations per phoneme. The root sinusoidal model described herein was compared to the corresponding multiplicative model in terms of the percentage of variance non accounted for in the duration set. In both cases, the sum-of-products coefficients, following the appropriate transformation, were estimated using weighted least squares as implemented in the Splus v3.2 software package. It was found that while the multiplicative model left 15.5% of the variance accounted for, the root sinusoidal model left only 10.6% of the variance unaccounted for. This corresponds to a reduction of 31.5% in the percentage of variance not accounted for by this model.

Thus, a method and an apparatus for improved duration modeling of phonemes in a speech synthesis system have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for modeling phoneme durations comprising:

calculating durations for a phoneme using a generalized additive model that incorporates influences of contextual factors on the durations, the generalized additive model including a functional transformation that describes a shape containing an inflection point.

2. The method of claim 1 further comprising:

measuring durations of the phoneme appearing in training data to identify a duration range for the functional transformation.

3. The method of claim 1, wherein control parameters for the functional transformation define a location on the shape for the inflection point and a slope of the shape at the inflection point.

4. The method of claim 3 further comprising:

determining the control parameters by applying an inverse of the functional transformation to durations of the phoneme appearing in training data.

5. The method of claim 1, wherein the functional transformation comprises a root sinusoidal transformation.

6. The method of claim 5, wherein the functional transformation comprises:

$$F(x)=\left\{\frac{B-A}{2}\left[\cos\left(\pi\frac{x-A}{B-A}\right)\right]^{\alpha}+\frac{A+B}{2}\right\}^{\beta}$$

wherein x is a duration for the phoneme, A is a minimum duration for the phoneme, B is a maximum duration for the phoneme, $\alpha$ controls a slope of the shape at the inflection point, and $\beta$ controls a location on the shape of the inflection point.

7. A computer-readable medium having executable instructions to cause a computer to perform a method comprising:

calculating durations for a phoneme using a generalized additive model that incorporates influences of contextual factors on the durations, the generalized additive model including a functional transformation that describes a shape containing an inflection point.

8. The computer-readable medium of claim 7, wherein the method further comprises:

measuring durations of the phoneme appearing in training data to identify a duration range for the functional transformation.

9. The computer-readable medium of claim 7, wherein control parameters for the functional transformation define a location on the shape for the inflection point and a slope of the shape at the inflection point.

10. The computer-readable medium of claim 9, wherein the method further comprises:

determining the control parameters by applying an inverse of the functional transformation to durations of the phoneme appearing in training data.

11. The computer-readable medium of claim 7, wherein the functional transformation comprises a root sinusoidal transformation.

12. The computer-readable medium of claim 11, wherein the functional transformation comprises:

$$F(x)=\left\{\frac{B-A}{2}\left[\cos\left(\pi\frac{x-A}{B-A}\right)\right]^{\alpha}+\frac{A+B}{2}\right\}^{\beta}$$

wherein x is a duration for the phoneme, A is a minimum duration for the phoneme, B is a maximum duration for the phoneme, $\alpha$ controls a slope of the shape at the inflection point, and $\beta$ controls a location on the shape of the inflection point.

13. A system comprising:

a processor coupled to a memory through a bus; and a process executed from the memory by the processor to cause the processor to calculate durations for a phoneme using a generalized additive model that incorporates influences of contextual factors on the durations, the generalized additive model including a functional transformation that describes a shape containing an inflection point.

14. The system of claim 13, wherein the process further causes the processor to measure durations of the phoneme appearing in training data to identify a duration range for the functional transformation.

15. The system of claim 13, wherein control parameters for the functional transformation define a location on the shape for the inflection point and a slope of the shape at the inflection point.

16. The system of claim 15, wherein the process further causes the processor to determine the control parameters by applying an inverse of the functional transformation to durations of the phoneme appearing in training data.

17. The system of claim 13, wherein the functional transformation comprises a root sinusoidal transformation.

18. The system of claim 17, wherein the functional transformation comprises:

$$F(x) = \left\{ \frac{B-A}{2} \left[ \cos\left( \pi \frac{x-A}{B-A} \right) \right]^{\alpha} + \frac{A+B}{2} \right\}^{\beta}$$

wherein x is a duration for the phoneme, A is a minimum duration for the phoneme, B is a maximum duration for the phoneme, α controls a slope of the shape at the inflection point, and β controls a location on the shape of the inflection point.

19. An apparatus comprising:

means for calculating durations for a phoneme using a generalized additive model that incorporates influences of contextual factors on the durations, the generalized additive model including a functional transformation that describes a shape containing an inflection point.

20. The apparatus of claim 19 further comprising:

means for measuring durations of the phoneme appearing in training data to identify a duration range for the functional transformation.

21. The apparatus of claim 19, wherein control parameters for the functional transformation define a location on the shape for the inflection point and a slope of the shape at the inflection point.

22. The apparatus of claim 21 further comprising:

means for determining the control parameters by applying an inverse of the functional transformation to durations of the phoneme appearing in training data.

23. The apparatus of claim 21, wherein the functional transformation comprises a root sinusoidal transformation.

24. The apparatus of claim 23, wherein the functional transformation comprises:

$$F(x) = \left\{ \frac{B-A}{2} \left[ \cos\left( \pi \frac{x-A}{B-A} \right) \right]^{\alpha} + \frac{A+B}{2} \right\}^{\beta}$$

wherein x is a duration for the phoneme, A is a minimum duration for the phoneme, B is a maximum duration for the phoneme, α controls a slope of the shape at the inflection point, and β controls a location on the shape of the inflection point.

* * * * *